3,220,970
ACID-CURED FURFURYL ALCOHOL OR FUR-FURYL ALCOHOL/FURFURAL POLYMER, WITH PLASTER OF PARIS
Börge Ingmar Carlström, Strandbaden, and Karl-Axel Rumberg, Viken, Sweden, assignors, by mesne assignments, to Hoeganaes Development Co. Ltd., Toronto, Ontario, Canada, a company of Canada
No Drawing. Filed Oct. 13, 1961, Ser. No. 144,846
Claims priority, application Sweden, Oct. 20, 1960, 10,050/60
2 Claims. (Cl. 260—37)

Furan plastics are now widely used as constructional materials in the chemical industry owing to their very good resistance. Said resins have gained a particularly great use, combined with inert fillers, as jointing mass for sulphite digesters and floor bricklaying. Furan resins are further widely used together with glass fibres for the manufacture of tubes, plates and containers.

Furan plastic is usually a liquid resin which is caused to harden by the addition of strong acids. This hardening is usually effected at room temperature or at a slightly increased temperature, and para-toluene-sulphonic-acid chloride is usually used as catalyst, either alone or combined with strong acids such as sulphuric acid or p-toluene-sulphonic acid.

The joints or laminates thus produced have the disadvantage of getting very much impaired at temperatures of about 140–150° C. The jointing masses get cracked or scale off, and the strength of the laminates is decreased. Tests have proved that this is mainly due to the para-toluene-sulphonic-acid chloride. If, in an effort to substitute this compound, the amount of strong acid is increased, the hardening of the mass is poor at a low temperature, or the hardening time is too long.

The present invention has proved that a furan plastic composition based upon furfuryl alcohol, and possibly also furfural in a quantity of up to 50 percent by weight of the furfuryl alcohol will have improved properties if it contains as a hardening catalyst not only a strong acid but also plaster of Paris.

It has been found that such a furan plastic composition hardens very well at a low temperature while using a comparatively low amount of acid as catalyst. This is an advantage as the acid is an undesired constituent in the plastic.

The plaster of Paris shall have a composition making it possible to absorb water, its formula preferably being $CaSO_4 \cdot \frac{1}{2} H_2O$. The amount of plaster of Paris is preferably 2–30 percent by weight of the furan plastic, and the amount of acid is so chosen that the composition solidifies within 24 hours at a temperature of 10–60° C. In this way a composition is obtained which solidifies so slowly that you can work with it, for instance when it is used as a jointing mass, but which solidifies within a reasonable time after having been applied.

We prefer as strong acid to use phosphoric acid, sulphuric acid or a sulphonic acid. As indicated above the quantity of acid shall be chosen to give the desired hardening time. The examples state some useful amounts of sulphuric acid.

The furan composition according to the invention contains preferably fillers and reinforcing agents which are chosen in a known manner to fit the desired field of use. The examples disclose useful amounts of quartz powder used as filler.

It is possible to obtain a further improvement of the low-temperature hardening composition of this invention if the plastic contains an amino-silane having the general formula $R_n SiX_{4-n}$, where $n$ is a whole number less than 4 and where R is an organic radical which is combined with the silicon atom by a C-Si bond and which contains at least one NH-group, and X is a hydroxyl, halogen, alkoxy, aroxy or amino group. It is preferred to add the silane, e.g. amino-propyl silane, to the furan resin in a quantity of 0.05–5%, and to add 5–20% of plaster of Paris to the filler, usually quartz powder, and then to admix sulphuric acid, having a concentration of 60–100%, preferably 70%, in a quantity of 0.5–2.5%.

*Example 1*

Furan plastic was made by reacting 1 part of weight of furfuryl alcohol with 0.2 part of weight of furfural at 100° C. in the presence of sulphuric acid, giving after the water had been driven off a resin having the viscosity of 1000 centipoises.

50 grams of plaster of Paris and 20 grams of sulphuric acid having a concentration of 70% were added to 1000 grams of quartz powder, and the mixture was stirred thoroughly.

100 grams of the furan plastic were added to 250 grams of said powder mixture, yielding a jointing mass which solidified at room temperature within 5 hours. The hardened mass can be heated to 210° C. without cracking, and it can be dipped into cold water at a temperature of 210° C. seventeen times before it is deformed.

*Example 2*

0.1 gram of amino-propyl-silane and 250 grams of the powder mixture described in Example 1 were added to 100 grams of the furan plastic described in Example 1. The solidified mass can be dipped into cold water at a temperature of 210° C. twenty-five times without being deformed.

*Example 3*

Furfuryl alcohol is reacted at 70° C. in the presence of sulphuric acid, and the water is driven off in vacuum, yielding a resin having a viscosity of 200 centipoises. An amino-functional silane "Z6020" made by Dow Corning is added to said resin in a quantity of 0.25%.

A powder is made by mixing in a ball mill 1000 grams of quartz powder, 200 grams of plaster of Paris and 26 grams of sulphuric acid having a concentration of 80%.

200 grams of said powder mixture were added to 100 grams of said furan plastic, yielding a mass which solidifies in one hour. The solidified mass was boiled in sulphuric acid having a concentration of 10% for 72 hours, and no change of the mass could be observed.

*Example 4*

1 part of weight of furfuryl alcohol and 0.3 part of weight of furfural are reacted at 90° C. to give a furan plastic having a viscosity of 10,000 centipoises, and said resin is modified by the addition of amino-butyl-silane in a quantity of 0.4%. 100 grams of this resin is mixed with 100 grams of a powder mixture made of 100 grams of graphite powder, 45 grams of plaster of Paris and 4 grams of p-toluene-sulphonic acid, and the mass thus produced is reinforced with glass fibres in the form of a so-called chopped strand mat, the quantity of glass fibres in the product being 25%. The product is hardened at 40° C., producing a laminate which is resistant to acids and alkalies, also at the high temperatures of 180–230° C.

What is claimed is:
1. A furane plastic composition especially suitable as a cold setting jointing mass comprising an intimate mixture of
(a) a condensation product selected from the group consisting of furfuryl alcohol resin and a condensation product of furfuryl alcohol and up to 50% furfural and
(b) a catalyst consisting of plaster of Paris and a strong acid selected from the group consisting of sulphuric acid, paratoluene sulphonic acid and paratoluene sulphonchloride, and (c) a filler, the quantity of plaster of Paris amounting to 2–30% by weight of the condensation product in the composition and the acid being added in an amount sufficient to cause setting of the composition within 24 hours at a temperature of 10–60° C.

2. A furane plastic composition as defined in claim 1 comprising 0.05 to 5% based upon the weight of said condensation product of an amino-alkyl-silane.

References Cited by the Examiner
UNITED STATES PATENTS 2,471,600　5/1949　Adams et al. _____ 260—88.5

MORRIS LIEBMAN, *Primary Examiner.*

MILTON STERMAN, *Examiner.*